Oct. 23, 1928.
N. AAS
TEAT CANNULA
Filed Sept. 3, 1927
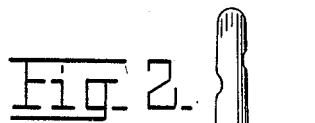
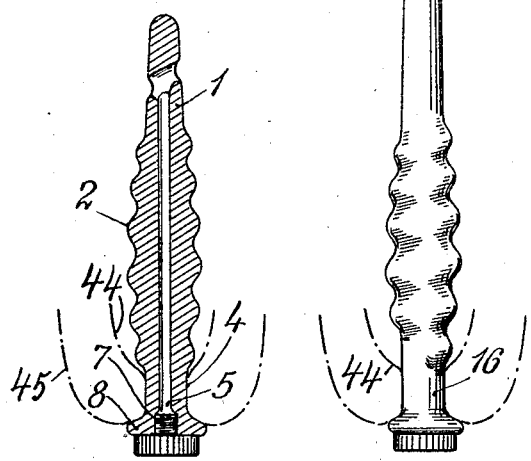
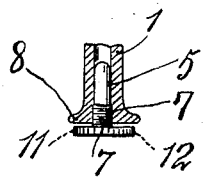
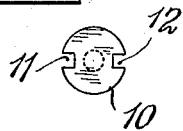
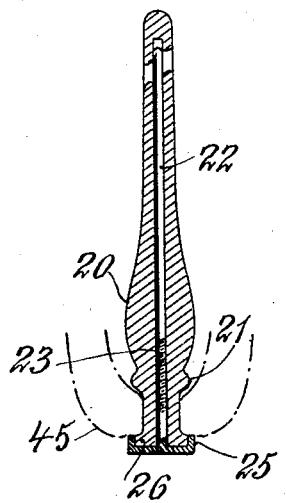
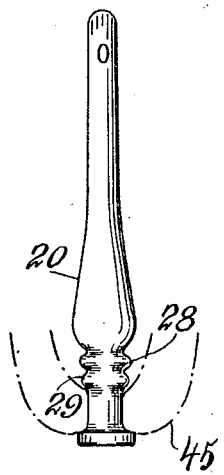
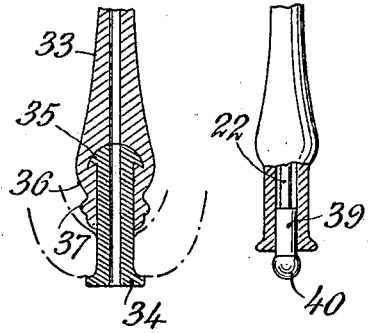

Patented Oct. 23, 1928.

1,688,795

UNITED STATES PATENT OFFICE.

NILS AAS, OF SKARNES, NORWAY.

TEAT CANNULA.

Application filed September 3, 1927, Serial No. 217,472, and in Germany, December 1, 1926.

The present invention relates to cannulæ for use in cows' teats and has for its object to provide a cannula which can be inserted without injuring the surface of the teat channel and which is held safely in the correct position when once inserted.

Teat cannulæ usually comprise a tubular body having at its lower end a flange or collar abutting against the end of the teat when inserted and which prevents the cannula from slipping in its entirety into the cavity of the teat. In order to prevent the cannula from slipping out of the teat channel, some known cannulæ of this type are provided with resistances in the form of screw threads on the portion of the cannula adjacent to the stop collar at the lower end of the cannula. Such screw threads allow the cannula of being inserted and withdrawn without injuring the teat by turning the cannula, but if torn out by accident the sharp screw threads of these known cannulæ will effect grave injury to the teat.

According to the present invention these drawbacks are avoided.

A cannula constructed according to the invention comprises one or more broad annular projections situated at a distance from the end collar of the cannula substantially corresponding to the length of the narrowest portion of the teat channel. The tubular portion of the cannula between the collar and said annular projection has a smooth surface and the projections are rounded at top as well as at the root so that they will not hurt the teat when inserted or removed. The side of the annular projection facing the collar at the open end of cannula has a comparatively steep surface so as to offer a substantial initial resistance against extraction.

Another important feature of the cannula according to the invention consists in the provision of means, whereby the cannula can be closed at the lower end without substantially enlarging or extending the part of the cannula which is not enclosed in the teat when in operative position. According to the invention a closing needle is provided, which is secured in closing position by means of screw threads in the boring of the cannula, or by friction between the needle and the surfaces of the said boring. The screw threads or other fastening means are arranged in the boring at least in part above the end collar of the cannula so that no downward extension or enlargement of the cannula proper is necessitated.

The invention is illustrated in the accompanying drawing.

Fig. 1 is a longitudinal sectional view on an enlarged scale of a cannula according to the invention.

Fig. 2 is a view of a modified construction.

Fig. 3 is a detail view of a cannula with closing needle inserted.

Fig. 4 is a top view of the head of the closing needle.

Figs. 5, 6, 7 and 8 illustrate further modifications of cannulæ.

In the examples illustrated in Figures 1 and 2 the annular projections (2) are placed in the form of screw threads while in the other modifications shown in the drawing the projections are of properly annular or circular shape.

In the examples illustrated in Figs. 1 and 2 the middle part of the cannula has a thickened portion 2, tapering towards both ends. The surface of this thickened portion has a screw threaded form. The portion of the cannula boring encircled by the collar 8 is provided with screw threads 7 to engage with corresponding screw threads on a closing needle 5. The outer surface 45 of the teat abuts against the upper surface of the collar 8. The inner surface 44 of the teat cavity abuts against the side of the lowest annular projection on the cannula body. The cylindrical portion 16 of the cannula is enclosed in the narrow outlet channel from the teat cavity.

In the arrangement illustrated in Figs. 3 and 4 the head 10 of the closing needle has notches 11 and 12 to be engaged by an opening key so that the removal of the needle can be effected also by clumsy fingers. When the cannula body is of greater length as indicated in Fig. 2 the upper (inner) portion 15 of the same is suitably made of flexible material such as rubber, guttapercha and the like while only the lower portion is made of rigid material such as for example aluminum. The flexible and rigid portions may then be connected in the manner illustrated in Fig. 7. In the example the portion 34, 35 may consist of metal, while the portion 33, 36, 37 is of rubber In the embodiment illustrated in Fig. 5 the cannula body carries two projections, of which the lower one 21 is comparatively narrow, while the upper one 20 is broad and is slightly tapering towards the upper end of the cannula. This cannula is provided with a long needle 22 with screw threads 23. The head 24, 25 is cupshaped and encloses the collar 22.

In the example on Fig. 6 two narrow annular projections 29, 28 are arranged below the broad tapering projection 20.

In the example illustrated on Fig. 8 the closing needle 22 is held in place in the cannula boring by the aid of an elastic coating 39 (for example a piece of rubber tubing) without screw threads being provided in the cannula boring.

Claims:—

1. A teat cannula having a tubular stem, a narrow collar on the lower open end of said stem and a thickened portion on the middle of said stem tapering towards both ends and having a comparatively steep surface at the end facing said narrow collar, the said steep surface being provided with a groove so as to form an annular convolution with a rounded top.

2. A teat cannula according to claim 1 wherein the thickened portion of the stem is provided with a plurality of grooves so as to form several annular convolutions thereon.

3. A teat cannula having a tubular stem, a narrow collar on the lower open end of said stem and a closing needle adapted to be inserted and fastened in the boring at the end of said tubular stem, the said closing needle being provided with a cupshaped head fitting over said narrow collar.

In testimony whereof I have signed my name to this specification.

NILS AAS.